Nov. 15, 1938.  E. J. HOUDRY  2,136,382
CATALYTIC CONVERSION OF HYDROCARBONS
Filed March 27, 1936
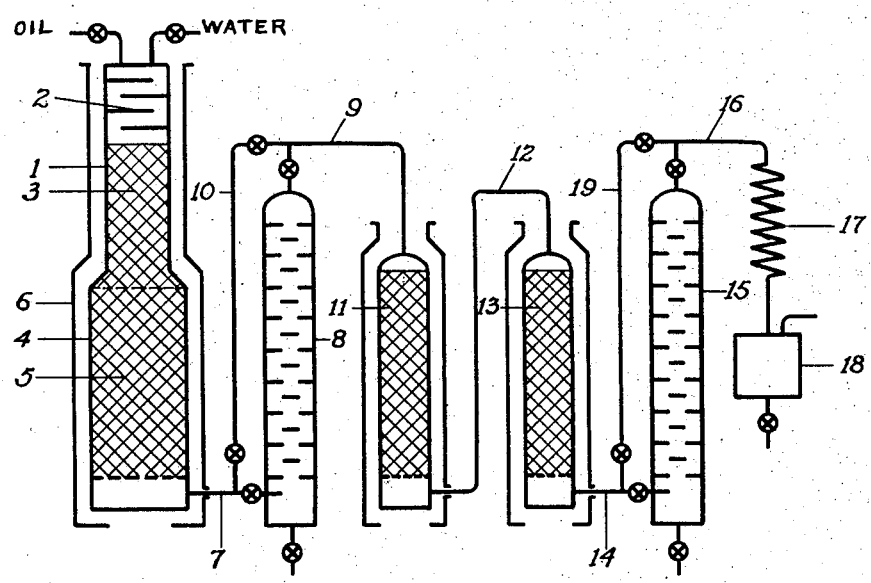
Inventor
Eugene J. Houdry.
by his attorney
Farnum F. Dorsey Patented Nov. 15, 1938

2,136,382

UNITED STATES PATENT OFFICE 2,136,382

CATALYTIC CONVERSION OF HYDROCARBONS

Eugene J. Houdry, Rosemont, Pa., assignor to Houdry Process Corporation, Dover, Del., a corporation of Delaware Application March 27, 1936, Serial No. 71,341

7 Claims. (Cl. 196—28)

This application is a continuation-in-part of my copending application, Serial No. 512,466, filed January 30, 1931.

This invention relates to a process by which, through the operation of catalysts at moderate temperatures and under pressures not substantially above atmospheric, any hydrocarbons having a boiling range above that commonly assigned to gasoline or motor fuel may be transformed into gasoline or motor fuel free from sulphur and having great stability and high anti-knock character, or by which the hydrocarbon material may be transformed partly into such motor fuel and partly into heavier products, including lubricating oil, characterized by viscosity, stability and freedom from sulphur. This invention also involves the purification and/or refining of hydrocarbons including those composed to substantial or large extent of components within the gasoline boiling range.

The operation of the process depends upon the use, under proper conditions of temperature, of series of catalysts which, so far as I am aware, have never before been used to produce the results hereinafter described.

The accompanying drawing is a diagrammatic representation of apparatus in which the process may be carried out.

The illustrated apparatus comprises a chamber or vessel 1 in which the oil which is to be treated is vaporized. The oil is fed to the upper end of this chamber upon baffles 2 upon which it is heated in thin films, and it then enters a mass 3 which is highly porous but not adsorbent or catalytic in character. This mass may be made, for example, of small bodies of porous earthenware. In this mass, the oil is brought gradually to a temperature suitable for its vaporization. Steam is also introduced at the upper end of the vaporizing chamber for purposes which will be described later.

The lower end of the vaporizing chamber communicates directly with the upper end of a conversion chamber 4 containing one of the catalytic masses characteristic of the present process. This mass 5 consists primarily of adsorbent or catalytic material, preferably though not necessarily of a silicious nature, such for example as adsorbent silicates or blends of silica and alumina, including fuller's earth or clay activated by acid or other chemical treatment. The material, whether of natural or artificial origin, is preferably molded in the form of small tubular bodies, rings or plugs, so as to provide a mass which can be readily penetrated by the oil-vapors. While adsorbent silicious material will act effectively by itself as a catalyst, it is desirable, in treating some hydrocarbons, to add thereto a small quantity of other active material, such for example as alumina. Both of the chambers 1 and 4 are enclosed in a suitable jacket or furnace 6, in which they may be heated or controlled in temperature by any convenient means.

From the lower end of the catalytic chamber 4, the vapors of oil and water may be discharged through a pipe 7 to a fractionating tower 8. From the upper end of this tower, uncondensed vapors are discharged through a pipe 9 to a chamber containing a second contact material or catalyst 11. In a case where it is desirable to subject all of the products from the chamber 4 to the catalyst 11, the tower 8 will not be used, and in such case the vapors may pass from the pipe 7 to the pipe 9 through a valve-controlled by-pass 10, with or without heat exchange, as desired.

The contact material 11 consists of a base of an inert porous support which may be designated as merely absorbent since it has little or no adsorptive or catalytic activity under the conditions of operation, such as may be provided by bodies of porous earthenware, upon and within which some material having an affinity for mineral sulphur has been deposited. Among such materials are metals, such as nickel, cobalt or copper, for example. One method of deposition is by soaking the support in nitrate or other salt of the metal and then heating to convert the nitrate to an oxide.

From the contact material 11 the vapors pass on to a chamber containing a third contact material or catalytic mass 13. This mass consists primarily of adsorbent silicate or blend of silica and alumina, of natural or artificial origin, or other adsorbent material including other adsorbent silicious compounds such as activated clay or silica gel, for example. This material is molded or otherwise prepared in the form of small bodies of tubular or solid form. In the case of some clays the addition of a small amount, not over 3%, of free alumina is desirable to prevent fluxing during reactivation. Within these adsorbent bodies a small amount, preferably about one per cent., of one or more of the metals nickel, copper and cobalt in metallic form may be deposited. The deposition may be by adding the hydrate of the metal to the activated clay or artificial gel and converting the metal to a highly activated form by heating and reduction.

From the catalyst 13 the vapors may pass, through a pipe 14, to a fractionating tower 15, from which the uncondensed vapors and fixed gases pass, through a pipe 16, to a condenser 17 and a receiver 18. In a case where the fractionating tower 8 is used, the tower 15 need not be used, and in such a case the materials may pass from the pipe 14 to the pipe 16 through a valve-controlled pipe 19.

While two fractionating towers have been shown as embodied in the apparatus, it will be understood that this is for diagrammatic purposes and that in apparatus arranged for the commercial conduct of a specific operation upon a specific product, often only one such tower is required. In an operation in which it is sought to convert all or practically all of a heavy hydrocarbon into gasoline or motor fuel, a fractionating tower located as in the case of the tower 8 may be used, so that only the ultimate product, namely the low-boiling constituents going to make up the desired product, will be passed through the contact materials 11 and 13, while the condensate from the tower 8 will be drawn off at the bottom and subjected to further decomposition in the chamber 4 or a similar catalytic chamber. On the other hand, where it is desired to produce an improved product such as a transformer oil or a lubricating oil and a low-boiling product or gasoline is simultaneously produced as a result of the process, all of the vapors or fluid products of reaction may advantageously be passed from reaction chamber 4 directly through the contact materials 11 and 13, and fractional condensation will take place thereafter, as in the case of the tower 15, the transformed and purified high-boiling products being drawn off from the bottom of this tower. However, as hereinabove indicated, it may be desired to subject all or approximately all of the fluid products from chamber 4 to action of the contact materials in chambers 11 and 13 whether one or another of the fractions of the products from the reaction chamber 4 may be desired most.

At the beginning of the normal operation of the apparatus, the catalytic material in the chamber 11 is in metallic form and in a highly divided condition, and the same is true of the metal in the chamber 13. Any metal or metals which may be used in the chamber 4, in addition to the adsorbent silicate, are in the form of oxides. The pressure throughout the apparatus is low, preferably not much more than is necessary to cause the vapors to flow, i. e., only slightly above atmospheric pressure, and in some cases it may be desirable even to use a sub-atmospheric pressure, which may be secured in a well-known manner, for example by the use of a vacuum pump. The temperature maintained in the vaporizing chamber 1 and the rate of feed of the oil are such as to complete, as nearly as possible, the vaporization of the oil by the time it reaches the conversion chamber 4. This vaporization may be assisted by the introduction of water-vapor, which mingles thoroughly with the oil-vapors in the mass 3. The conversion catalyst 5 is maintained at a temperature dependent on the nature of the raw material, and on the extent or character of the conversion which is required. The temperature in practice will vary between 550° and 1000° F. For extensive conversion or cracking of hydrocarbon reactants, e. g., higher boiling hydrocarbons, to produce gasoline, the temperature will usually be above 800° F., although, depending upon conditions, such as particular nature of the charge, time of contact, etc., somewhat lower temperatures may be employed. For the production of lubricating oils and transformer oils with a minimum of cracking, the temperature will usually be below 750° F. The effect of the catalyst 5 upon the material is profound, and cannot be fully described, but in general and especially in the upper part of the temperature range, it results in the complete decomposition of a certain amount of material, with the production of free carbon and fixed gases, and in the production of a substantial quantity of aromatics and unsaturated compounds. Inorganic sulphur compounds are converted completely to hydrogen sulphide, while between 70 and 80 per cent. of the organic sulphur compounds are also broken down and converted to hydrogen sulphide.

The function of the second contact material in the chamber 11 is primarily to remove the sulphur. This results from reaction between the hydrogen sulphide and the metal, the metal being converted to a metallic sulphide. This contact material also effects a further transformation in the oil, in the direction of increasing the unsaturated compounds. The temperature in the chamber 11 may be maintained between 550° and 750° F. but the range of preferential operation is 600° to 650° F. It will be understood that the top temperature of the chosen range for the desulphurizing zone or chamber 11, e. g., 650° F., will ordinarily (though not necessarily) be as low or lower than the temperature employed in the preceding conversion zone, i. e., chamber 4.

The products emerging from the chamber 11 are unstable and contain undesirable coloring matters. These defects are corrected in the final contact material or catalyst 13, where also the remaining small quantity of sulphur is removed. This catalyst is maintained at a temperature or temperatures below that of chamber 11, e. g., in the range of approximately 400° F. to 500° F.

Feed stocks differ so widely in composition that definite feed rates cannot be given. In general the rate on the conversion catalyst 5 can vary from 10 to 30 liters of charge on 20 liters of catalyst per hour (10/20 to 30/20). Much higher rates can be used in the refining catalysts 11 and 13, as from 20/20 to 200/20. A typical operation for gasoline production involves a rate of 16/20 in the conversion chamber, 100/20 in the desulphurizing chamber, and 60/20 in the refining and stabilizing chamber.

The water-vapor does not decompose or take part as a reactant in any chemical reaction in the process, being usually substantially completely recovered in the condenser 17. In addition, however, to assisting in the vaporization and movement of the oil, it performs a very important function, namely that of assisting in the escape, from the adsorbent catalysts, of the reaction products which would otherwise remain adsorbed by these catalysts so as to prevent the continuous and efficient action of the process. This use of water-vapor is an exemplification of an invention which is not claimed or further described herein, since it forms no part of the present invention.

The several contact materials catalysts become contaminated or poisoned in the course of the process by coky and tarry deposits, and by conversion of the metals in contact materials in 11 and 13 to sulphides. It is accordingly necessary to reactivate the contact materials from time to time, which may be done in a well-known manner by passing air through them to oxidize or burn out the sulphur and the carbon. The metallic oxides so produced may then be reduced, in the contact materials in 11 and 13, by the passage of hydrogen or of gases containing hydrocarbons rich in hydrogen. The methods of reactivation need not be further described herein, since they form the subject matter of several other applications for Letters Patent of the United States which have issued since application, Serial No. 512,466, parent hereto, was filed. Patent No. 2,035,467, issued to Warren F. Faragher and myself on March 31, 1936, and Patent No. 2,073,638, issued to me on March 16, 1937, illustrate suitable methods of regeneration or reactivation of such contact materials. Among earlier inventions which illustrate useful steps for regeneration of catalysts or contact materials, and especially for reduction of the latter, is Patent No. 1,822,293, issued to Alfred Joseph on September 8, 1931.

The raw material used in the present process may be any hydrocarbon oil and the product may be either a volatile gasoline or motor fuel, or mixture thereof with other hydrocarbons or any of the recognized higher boiling products such as transformer or lubricating oils. In every case, some volatile motor fuel is produced, and it has the characteristics of being colorless, free from sulphur, of good odor, highly stable and high in anti-knock character. A typical product will have a composition comprising approximately 45 per cent of paraffins, 16 per cent of naphthenes, 30 per cent of aromatics and 9 per cent of stable unsaturates. The specific gravity of such an illustrative product may vary between .730 and .760, according to the charging stock and its distillation curve may be practically a straight line.

The operation of the process ordinarily involves a progressive decrease in temperatures from zone to zone. When production of motor fuel is the primary object the decrease may be of the order of 200° F. between adjacent zones. For example a typical operation involves a temperature of 825 to 850° F. in the cracking zone 4, a temperature of about 650° F. in the desulphurizing zone 11, and a temperature of about 450° in the refining or stabilizing zone 13. All condensates heavier than the motor fuel desired may be retreated for complete conversion. In this case, it is necessary or at least desirable to use increasing temperatures in the conversion chamber 4, since the retreated material becomes increasingly resistant to decomposition.

In case the primary object of the process is the production of an improved transformer oil or lubricant and the production of motor fuel is secondary, the decrease in temperature between catalytic zones is usually smaller, as of the order of 100° F. In a typical operation conversion zone 4 is at a temperature of about 700° F., the desulphurizing zone at about 600° F., and the final refining zone at about 500° F. By the use of the process the oil is desulphurized, freed from constituents which are readily oxidized, and its viscosity may also be increased. However, these temperature differences or decreases in successive reaction zones are illustrative only and are not limited to the particular reactions given, nor are reactions utilizing the invention limited to such temperature decreases.

If the charging stock contains very little sulphur the second or desulphurizing stage or zone may be omitted without substantial impairment of the quality of the product whether it be motor fuel, transformer oil or lubricating oil. In such case both catalytic masses may have as their essential base the same highly active and selectively adsorbent material, such as activated hydrosilicate of alumina or a synthetically prepared equivalent of the same and the operating temperature will be the same as indicated above, for example 550° to 1000° F. for the conversion zone, and 400° to 500° F. for the refining and stabilizing zone.

What I claim is:

1. In the production of refined lower boiling hydrocarbons including those within the light motor fuel or gasoline boiling range in a continuous straight-through operation from a composite hydrocarbon charge boiling to substantial extent above the gasoline boiling range, the steps of process which comprise heating and passing the hydrocarbon charge through a confined conversion zone containing an adsorptive silicious catalytic material maintained at a temperature substantially within the range of 800° to 1000° F. so as to convert a substantial proportion of said charge into lower boiling hydrocarbons, continuously passing substantially all of the fluid products of reaction from said conversion zone through a confined desulphurizing zone containing a metalliferous contact material capable of reacting with sulphurous components of said fluid products by undergoing chemical change to a metal sulphide form, said contact material being maintained within the temperature range of 550° to 750° F., continuously passing said fluid products from said desulphurizing zone through a refining zone containing an adsorptive catalytic material comprising an active silicate, the last-mentioned catalytic material being maintained at a temperature substantially below that maintained in said desulphurizing zone and above 400° F., and continuously withdrawing fluid products from said refining zone.

2. In the production of refined lower boiling hydrocarbons including those within the light motor fuel or gasoline boiling range in a continuous straight-through operation from a composite hydrocarbon charge boiling to substantial extent above the gasoline boiling range, the steps of process which comprise heating and passing the hydrocarbon charge through a confined conversion zone maintain at a temperature within the range of 650° to 1000° F. at which hydrocarbons outside of the gasoline boiling range will be transformed to substantial extent into hydrocarbons within the light motor fuel or gasoline boiling range, continuously passing substantially all of the fluid products of reaction from said conversion zone through a confined desulphurizing zone containing a metalliferous contact material capable of reaction with sulphurous components of said fluid products by undergoing chemical change to metal sulphide form, said contact material being maintained at a temperature substantially below that of said conversion zone and within the range of 550° to 750° F., continuously passing said fluid products from said desulphurizing zone through a refining zone containing an adsorptive catalyst comprising an active silicious material, the last-mentioned catalytic material being maintained at a temperature substantially below that maintained in said desulphurizing zone and above 400° F., and continuously withdrawing fluid products from said refining zone.

3. In the production of refined lower boiling hydrocarbons including those within the light motor fuel or gasoline boiling range in a continuous straight-through operation from a composite hydrocarbon charge boiling to substantial extent above the gasoline boiling range, the steps of process which comprise heating and passing the hydrocarbon charge through a confined conversion zone maintained at a temperature within the range of 700° to 1000° F. at which hydrocarbons above the gasoline boiling range will be transformed into lower boiling hydrocarbons, a substantial proportion of the latter being within the light motor fuel or gasoline boiling range, continuously passing substantially all of the fluid products of reaction from said conversion zone through a confined desulphurizing zone containing an absorptive, but substantially non-adsorptive, support impregnated with a metalliferous material from the group nickel, cobalt and copper and being maintained at a temperature at least approximately 100° F. below that of said conversion zone and within the range of 600° to 750° F., continuously passing substantially all of the fluid products of reaction from said conversion zone through a refining zone containing an adsorptive catalytic material comprising an active silicious material having incorporated therewith a relatively small proportion of a metalliferous material from the aforesaid group nickel, cobalt and copper, the last-mentioned catalytic material being maintained at a temperature at least approximately 100° F. below that of said desulphurizing zone and above 400° F., continuously withdrawing fluid products from said refining zone, and fractionating the last-mentioned products to separate a gasoline fraction of high quality from remaining hydrocarbon products.

4. In the production of refined hydrocarbons including gasoline and higher boiling materials from a composite hydrocarbon charge boiling to substantial extent above the gasoline boiling range, the steps of process which comprise heating and passing a stream of the hydrocarbon charge through a confined reaction zone containing an adsorptive silicious contact material and maintained under such temperature within the range of 550° to 1000° F. as to effect the desired production of gasoline or higher boiling hydrocarbon materials, continuously passing substantially all of the fluid products from the aforesaid reaction zone into and through a confined desulphurizing zone containing a metalliferous contact material capable of reaction with sulphurous components of said fluid products by undergoing chemical change to metal sulphide form, said desulphurizing zone being maintained within the range of 550° to 750° F., continuously passing said fluid products from said desulphurizing zone through a refining zone containing an adsorptive catalyst comprising an active silicious material, said refining zone being maintained at lower temperature than said desulphurizing zone but above 400° F., withdrawing fluid products from said refining zone, and fractionating the last-mentioned products to segregate desired fractions.

5. In a process for refining and chemically stabilizing fluid hydrocarbons composed predominantly of gasoline, the steps which comprise charging a stream of said hydrocarbons into a confined desulphurizing zone containing a contact material or mass comprising an absorbent support impregnated with a metalliferous material capable of reacting with sulphurous components of the hydrocarbons charged to said zone by undergoing chemical change to metal sulphide form, said desulphurizing zone being maintained at such temperature that the hydrocarbons treated therein are in a superheated vapor state, said temperature being within the range of 550° to 750° F., continuously passing fluid products from said desulphurizing zone through a refining zone containing a catalyst comprising an adsorptive silicious material, said refining zone being maintained at temperature below the aforesaid range and above 400° F. at which no substantial condensation of the hydrocarbon vapors being treated will occur, and continuously withdrawing chemically stabilized fluid products from said refining zone.

6. In refining and chemically stabilizing fluid hydrocarbons composed largely of components within the gasoline boiling range, the steps of process which comprise charging a vaporous stream of said hydrocarbons into a confined desulphurizing zone containing a contact material or mass comprising a metalliferous material capable of reacting with sulphurous components of the hydrocarbons charged to said zone by undergoing chemical change to metal sulphide form, said desulphurizing zone being maintained at such temperature that the said stream of hydrocarbons is therein maintained in a condition of substantial superheat, said temperature being within the range of 550° to 750° F., continuously passing fluid products from said desulphurizing zone through a refining zone containing a catalyst comprising an adsorptive silicious material and being capable of effecting a chemical stabilization of the hydrocarbons charged thereto, said refining zone being maintained at such temperature below that of said desulphurizing zone and above 400° F. that the desulphurized vapors are therein maintained in a state of superheat, the temperature maintained in said refining zone being at least approximately 100° F. below that maintained in said desulphurizing zone, and continuously withdrawing chemically stabilized fluid products from said refining zone.

7. In refining and chemically stabilizing fluid hydrocarbons containing gasoline and higher boiling hydrocarbons but composed predominantly of gasoline, the steps of process which comprise charging a stream of said hydrocarbons into a confined desulphurizing zone containing a contact material or mass comprising a relatively catalytically inert absorbent material impregnated with an active metalliferous material from the group nickel, cobalt and copper, said zone being maintained at such a temperature within the range of 550° to 750° F. that the hydrocarbons treated therein are in a state of superheat, continuously passing substantially all of the fluid products from said desulphurizing zone through a refining zone containing a catalyst comprising a blend of silica and alumina having admixed therewith a relatively small amount of metalliferous material from the aforesaid group nickel, cobalt and copper, to effect a chemical stabilization and further desulphurization of the hydrocarbons charged thereto, said refining zone being maintained at a temperature below the aforesaid range and above 400° F., the temperature maintained in said refining zone being substantially below that maintained in said desulphurizing zone, continuously withdrawing chemically stabilized fluid products of reaction from said refining zone, and fractionating the last-mentioned products to separate a light motor fuel or gasoline from higher boiling components of such products.

EUGENE J. HOUDRY.

CERTIFICATE OF CORRECTION.

Patent No. 2,136,382.   November 15, 1938.

EUGENE J. HOUDRY.

It is hereby certified that error appears in the printed specification of the above numbered patent requiring correction as follows: Page 2, second column, line 66, after the word "materials" insert or; page 3, second column, line 46, claim 2, for "maintain" read maintained; and that the said Letters Patent should be read with this correction therein that the same may conform to the record of the case in the Patent Office.

Signed and sealed this 27th day of December, A. D. 1938.

Henry Van Arsdale (Seal)   Acting Commissioner of Patents.